Feb. 27, 1934.  W. J. GIBBS  1,949,119
AUTOMATIC STOP FOR ELECTRICALLY DRIVEN MACHINES
Filed Oct. 5, 1929  2 Sheets-Sheet 1
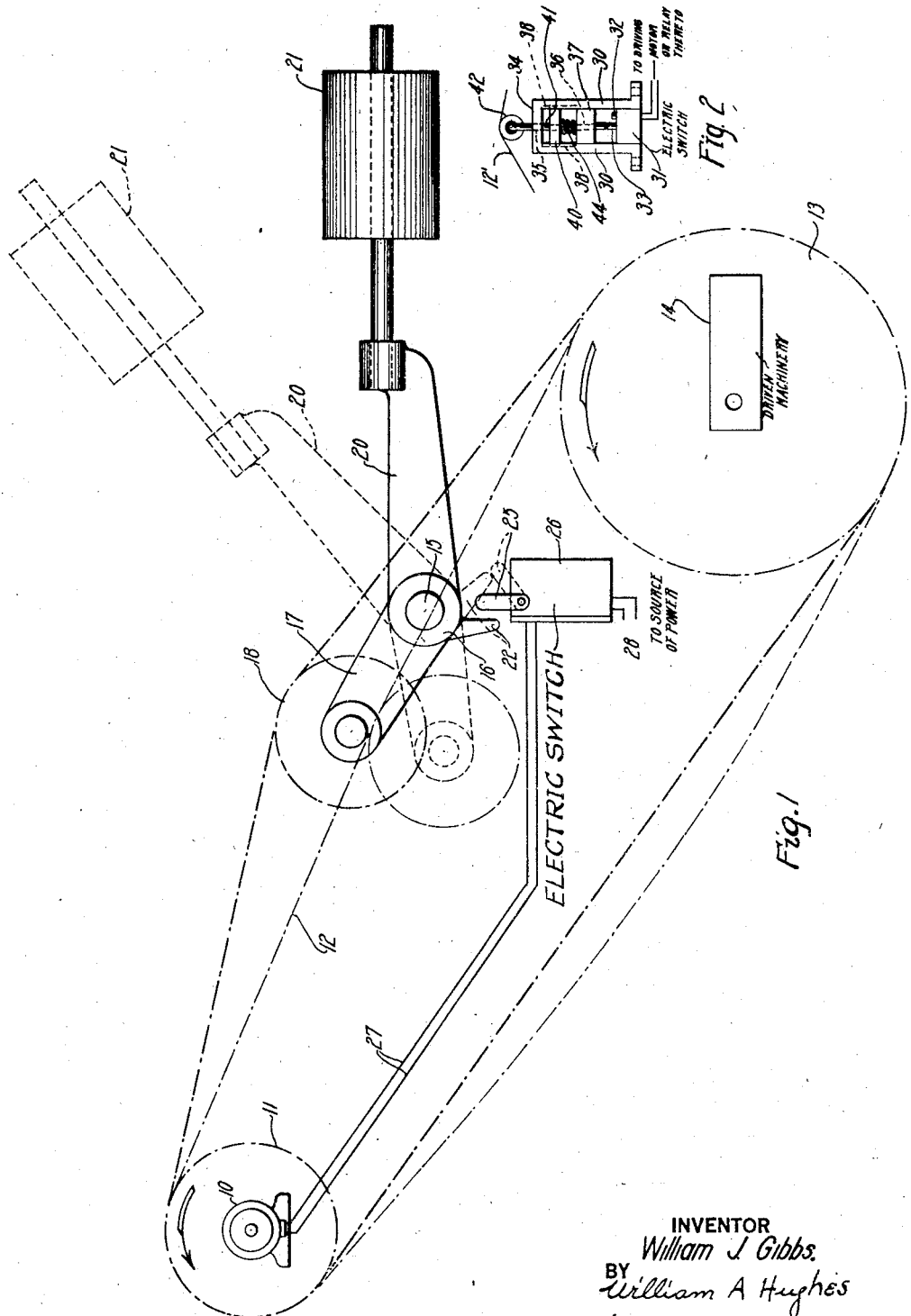
INVENTOR
William J. Gibbs.
BY William A Hughes
his ATTORNEY Feb. 27, 1934.  W. J. GIBBS  1,949,119
AUTOMATIC STOP FOR ELECTRICALLY DRIVEN MACHINES
Filed Oct. 5, 1929  2 Sheets-Sheet 2

INVENTOR.
William J Gibbs
BY William A Hughes
his ATTORNEY

Patented Feb. 27, 1934

1,949,119

UNITED STATES PATENT OFFICE 1,949,119

AUTOMATIC STOP FOR ELECTRICALLY DRIVEN MACHINES

William J. Gibbs, Brooklyn, N. Y.

Application October 5, 1929. Serial No. 397,576

3 Claims. (Cl. 192—150)

The present invention relates, generally, to automatic stops for machinery of various sorts and the embodiments thereof comprise means for very quickly discontinuing the application of power to driven parts; and, the invention relates, more particularly, to machinery having electric motor drive and automatic means for quickly discontinuing the electric current upon overload of the machinery. The present invention is useful on a great many kinds of power driven machinery to protect the same, as well as parts connected therewith and work handled thereby, against damage from overloading such as might occur from obstruction of the machinery or otherwise.

Automatic stops have been made, but these operate so slowly that considerable damage is done to the machinery, or to parts handled thereby, or to the operator, before power is disconnected therefrom; with the present invention the power is disconnected or discontinued, either directly or through relay, so quickly that nothing occurs further than a tripping or movement of certain elements in the driving parts which normally are relatively substantially immovable which plate is inherent in the structure or is present designedly to meet the mode of operation of the apparatus of the invention.

Various objects and advantages of the invention will be obvious from an examination of the accompanying drawings and the description of certin embodiments of the invention or will be specifically pointed out in connection therewith, and the invention consists in the various combinations and arrangements of parts set forth in the appended claims.

In the drawings:—

Figures 1 and 2 are somewhat diagrammatic representations respectively of an embodiment of the invention, and a modified form thereof, the latter in part.

Figure 4:
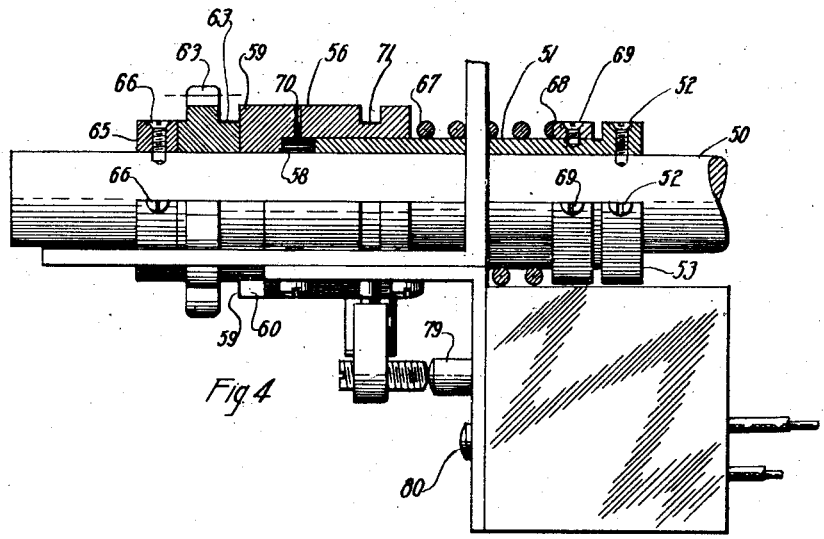
Figure 4 is a section view taken along the line 4—4 of Figure 3 and looking in the direction of the arrows.

As shown in the drawings, and referring to Figure 1, an electric motor 10 drives a driving sprocket 11 which in turn drives a sprocket chain 12, a driven sprocket 13 and a set of machinery 14, such as a conveyor, a packaging machine or any kind of machine or apparatus. At or adjacent to the upper or tight side of said sprocket chain 12 is stationed a pivotal support 15 upon which is mounted, for rotative movement, a bell crank 16. One arm 17, of said bell crank 16 carries, journaled thereon, an idler sprocket 18 which engages said sprocket chain 12 at the lower surface of the said upper or pulling side thereof. The other arm 20 of said bell crank 16 carries an adjustable counterweight 21 which tends to hold said idler sprocket 18 against said sprocket chain 12 and to maintain a hump in the pulling or tight side of the belt or chain, which hump is normally maintained by said counterweight 21 (or an equivalent such as a spring). Under loads greater than normal this hump will be straightened out and the apparatus as a result will be stopped through means hereinafter described. On said bell crank 16 is a stub arm 22 which projects downwardly into operative relation to a switch lever 25 which serves to open and close the electric switch 26, which latter is operative to connect and disconnect the circuit of said motor 10, being connected thereto by the lead wires 27, 27 and being connected to a source of operating current for motor 10 by the leads 28, 28. On clockwise movement from the closed circuit position shown in full lines to the open circuit position indicated by the dotted lines, said switch lever 25 opens said switch 26, upon which the latter will remain open until said lever 25 is manually returned by counterclockwise movement to closed circuit position.

In the use and operation of this embodiment of my invention for the purpose of shutting off the motor 10 upon a jam or overload on the machinery 14 before such jam or overload can cause any damage to said machine, or any part connected therewith or handled thereby, the switch operating apparatus of Figure 1 is set as illustrated by the full lines, with said counterweight 21 (or equivalent spring) adjusted so that it counterbalances the weight of said arm 17, of said idler sprocket 18 and of the upper part of said sprocket chain 12 whereby the chain is taken up in its normally tight side and so that a slight overload of said machinery 14, above normal load or above normal overload and consequent tightening or taking up of said hump, will actuate said bell crank 16 to rotate the same in a counterclockwise movement and thereby cause said stub arm 22 to engage and actuate said switch lever 25 in the clockwise direction whereby said switch 26 is opened and the motor 10 is stopped. The great advantage of this arrangement of parts is that the motor is disconnected and the machinery is stopped before any appreciable strain above normal can be applied to the parts of said machine 14 or any part connected thereto or handled thereby, other than said belt 14, because it will be necessary to take up the hump in said belt 14 before excessive strain or power is transmitted to such parts and as soon as the chain begins to take up then the switch is operated to open the motor circuit and discontinue the application of power. With an installation of an embodiment of the present invention on a conveyor apparatus described in my Patent Number 1,504,886, for example, an attendant's hand caught between a tray and the door jamb or an aluminum tray caught between the shelving and the door jamb will cause the motor to be electrically disconnected and the machinery stopped without injuring the hand or denting the tray. A further advantage is that the machinery has to be backed up, thus relieving the caught part and permitting removal thereof, before the motor can be started up again. To restart the machinery, the chain 12 is backed up to give normal slack and to reset idler sprocket 18 against the slacked belt, whereupon said switch lever 25 is moved manually to reclose said switch 26.

In Figure 2 of the drawings is shown an alternative form of chain or belt so an operated safety switch mechanism, in which a pair of guide bars 30, 30 carry at one end a commonly known type of electric push button switch 31 having a circuit closing button 32 and a circuit opening button 33. At their other end said guide bars 30, 30 support a connecting bar 34 which has a central guide opening 35 which is aligned with a guide opening 36 in an intermediate cross bar 37 which latter is fixed between said guide bars 30, 30. Between said connecting bar 34 and said cross bar 37, said guide bars 30, 30 have formed in their inner or opposing surfaces the guide channels 38, 38 in which is movably mounted the slide bar 40 which latter carries fixed thereto the rod 41 which extends in one direction through said opening 35 and terminates beyond said connecting bar and carries an idler sprocket 42 adapted to engage the sprocket chain 12', the latter being similar to sprocket chain 12 of Figure 1 and a part of similar driving apparatus shown in that figure. In the other direction said rod 41 extends through said opening 36 in said cross bar 37 and into operative relation to said circuit opening button 37. A compression spring 44 mounted about said rod 41 presses against said cross bar 37 at one end and at the other end against said slide bar 40 which latter it tends to move together with said rod 41 and said idler sprocket 42 to keep the latter in contact with said chain 12' to take up a hump in the latter. The operation of the apparatus of Figure 2 is similar to that of Figure 1, and any jamb or overloading in the machinery driven thereby causes said chain 12' to take up the hump, and move said rod 41 against said circuit opening button 33 whereby the driving motor is disconnected. Said chain 12' and the machinery driven thereby then have to be backed up to relieve the jam if that is the case of the stoppage, and to give slack in the part of the chain 12' engaged by said idler sprocket 42 whereupon said spring 44 will move said rod 41 away from said circuit opening button 33 and said circuit closing button 32 can then be manually pressed to again close the motor circuit and start the machinery in motion again. Also the idler sprocket or pulley or roller can be pressed against the outside surface of the chain or belt instead of against the inside as shown. Since either a belt or a chain can be used in this embodiment, the term belt is used for both in the claims.

Figure 3:
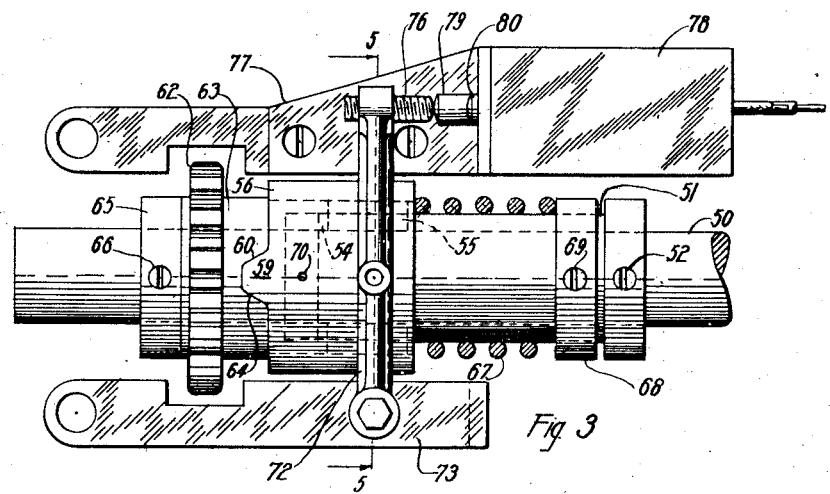
Figure 3 is an elevation view showing details of a device of the invention.
Figure 5:
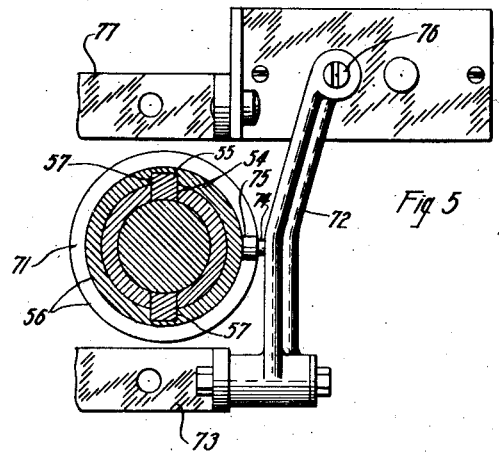
Figure 5 is a section view taken along the line 5—5 of Figure 3, and looking in the direction of the arrows.

In Figures 3, 4 and 5 is illustrated another embodiment of the invention in which a part of the driving mechanism is specially designed to have an amount of play which can be taken up on overload and thereby operative to open an electric switch of the driving motor circuit to stop the machinery before the overload causes any damage. This differs from the apparatus of Figures 1 and 2 in that in these former embodiments the span of the belt or chain gives a free play inherent in the driving parts per se, whereas in the device of Figs. 3 to 5 the parts having the free play are provided specifically for that purpose. They are alike however in that the free play is utilized to control an electric circuit to disconnect the driving motor before damage can be done.

In this embodiment as illustrated in Figs. 3, 4 and 5 the drive shaft 50 connected to an electric motor (not shown) carries a collared sleeve 51 fixed thereto by the set screws 52, 52 which latter extend through the collar 53 and set against said shaft 50. At the opposite end said sleeve 51 has formed therein, at diametrically opposite places, the two longitudinal slots 54, 54 in each of which sets a key 55 which extends above the surface of said sleeve 51. Slidable longitudinally over said sleeve 51 at said keys 55, 55 is a second sleeve 56 which has a pair of slots 57, 57 in its bore surface to receive said keys 55, 55 which cooperate therewith to keep said second sleeve 56 from turning on said sleeve 51 and to permit slidable longitudinal movement of said second sleeve 56 on the sleeve 51. At its outer end said second sleeve 56 has formed in its bore an inwardly extending shoulder 58 which fits slidably on the surface of said shaft 50. Also at its outer end, said second sleeve 56 carries a pair or diametrically spaced outward longitudinally extending dogs 59, 59 each of which has its lateral surfaces 60, 60 sloping with respect to its axis.

Adjacent said second sleeve 56, on said shaft 50, is a gear 62 having, integral therewith and facing toward said second sleeve 56, a collar 63 which latter has formed therein a pair of slots 64, 64 designed to fit exactly over said dogs 59, 59. A ring 65 held by set screws 66, 66 to said shaft 50, holds said gear 62 against movement away from said second sleeve 56; and a compression spring 67 positioned about said sleeve 51 and bearing at one end against the inner end of said second sleeve 56 and at the other end against an adjustable ring 68 secured on said sleeve 51 by set screws 69, 69, holds or tends to hold said dogs 59, 59 enmeshed with said slots 64, 64. Said spring 67 is adjusted in compression by setting the position of said adjustable ring 68 on sleeve 51 so that, during normal load transmitted from said shaft 50 to said gear 62, said dogs 59, 59 will be held enmeshed in said slots 64, 64 yet so as to allow said dogs 59, 59 to slide and unmesh from said slots 64, 64, whereby said second sleeve 56 is thrust longitudinally away from said collar 63. An oiling hole 70 is provided in said second sleeve 56 for admission of lubrication of the relatively moving surfaces within said sleeve 56.

On the outer surface of said second sleeve 56 is formed an annular square cut groove 71. Adjacent said groove 71 and aligned therewith is a lever 72 pivoted at one end to a support member 73 and carrying intermediate its ends a stud 74 which extends into said groove 71, a roller 75 being provided on said stud 74 to reduce friction with the sides of groove 71. At its outer end said lever 72 carries an adjustable screw 76 which extends therethrough in a direction transverse to the pivot of lever 72 and in the direction of movement of said second sleeve 56 on said sleeve 51.

Near the outer end of said lever 72 a support member 77 carries a two button push switch 78 of a commonly known type, of which the circuit opening button 79 is axially aligned with said adjustable screw 76 adapted to be engaged by the latter and to be moved thereby in circuit opening movement when said lever 72 is moved by said second sleeve 56 when the machinery driven by said gear 62 is overloaded or jammed. The button 80 serves to reset the switch 78 in closed circuit condition.

The operation of the embodiment of the present invention illustrated in Figs. 3, 4 and 5 is similar to that of the embodiments in Figs. 1 and 2, that is, under normal load operation the switch is closed and the take up or play of said second sleeve 56 is held up by said compression spring 67, but upon an overload or jam in the driven machinery the sloping sides of said slots 64, 64 push said dogs 59, 59 and said second sleeve 46 longitudinally against said compression spring 67, whereby the side of said groove 71 moves said stud 74 and said lever 72 whereby said screw 76 moves said circuit opening button 79 whereby the circuit is discontinued and the driving motor stops, and this occurs before any damage can be done by the overload or jam.

Having thus described my invention, what I claim as new and desire to secure by Letters Patent is:—

1. In combination, an electric driving motor, a driving element driven by the motor, a driven element, an endless driving member around said driving and driven elements, an electric switch for controlling the circuit of the electric motor, and means for opening the switch in response to an overload, said means including a weighted bell crank lever interposed between said elements and having a contact member for actuating said switch and also having a rotary idler on one end thereof bearing against the pulling side of the endless driving member and maintaining a hump therein, said endless driving member tending to take up said hump under influence of overload to move the bell crank lever.

2. In combination, an electric motor and driving sprocket, a driven sprocket, a sprocket chain between said driving and driven sprockets, an electric switch controlling the circuit to the motor, and means cooperating with said sprocket chain for actuating the switch to open the circuit in response to overload, said means including a pivotally supported weighted bell crank lever interposed between said sprockets, an arm connected therewith for actuating the switch, and an idler sprocket bearing against the pulling side of the chain and forming a hump therein which tends to straighten on overload producing movement of the lever to actuate the switch.

3. In an automatic stop for electrically driven machines, an electric driving motor, a driving sprocket driven by the motor, a driven sprocket connected with the machinery to be driven, a sprocket chain trained around said sprockets to afford driving connection therebetween, a pivot support adjacent the drive side of the chain, a bell crank lever pivotally mounted on the support and interposed between said sprockets, an idler sprocket connected with one arm of the bell crank lever and in mesh with the inner drive side of the chain, an adjustable weight on the other arm of the bell crank lever to so position the idler sprocket as to maintain a hump in the drive side of the chain, an electric switch controlling the circuit to the driving motor, and means connected with the bell crank lever intermediate its ends to actuate the switch to open the motor circuit in response to overloads which tend to straighten the hump in the drive side of the chain and to swing said lever on its pivot.

WILLIAM J. GIBBS.